United States Patent [19]
Rothstein

[11] Patent Number: 6,058,369
[45] Date of Patent: *May 2, 2000

[54] METHOD AND APPARATUS FOR MONITORING THE STRENGTH OF A REAL ESTATE MARKET AND MAKING LENDING AND INSURANCE DECISIONS THEREFROM

[75] Inventor: Robert E. Rothstein, Seattle, Wash.

[73] Assignee: R.E. Rothstein, Seattle, Wash.

[*] Notice: This patent is subject to a terminal disclaimer.

[21] Appl. No.: 08/867,200

[22] Filed: Jun. 2, 1997

Related U.S. Application Data

[63] Continuation of application No. 08/252,170, May 31, 1994, Pat. No. 5,636,117, which is a continuation-in-part of application No. 08/041,144, Mar. 31, 1993, abandoned, which is a continuation of application No. 07/667,584, Mar. 11, 1991, abandoned.

[51] Int. Cl.[7] .................................................. G06F 17/60
[52] U.S. Cl. .................................... 705/10; 705/4; 705/38
[58] Field of Search ................................. 705/4, 10, 7, 38

[56] References Cited

U.S. PATENT DOCUMENTS

| | | | |
|---|---|---|---|
| 4,742,457 | 5/1988 | Leon | 705/35 |
| 4,774,664 | 9/1988 | Campbell | 705/38 |
| 5,025,138 | 6/1991 | Cuervo | 705/38 |
| 5,245,536 | 9/1993 | Hsieh | 705/35 |
| 5,361,201 | 11/1994 | Jost | 705/35 |
| 5,631,828 | 5/1997 | Hagan | 705/4 |

*Primary Examiner*—Allen R. MacDonald
*Assistant Examiner*—Michele Stackey Crecca
*Attorney, Agent, or Firm*—Christensen O'Connor Johnson & Kindness PLLC

[57] ABSTRACT

By gathering information regarding the total number of sales, total number of pending listings, total number of active listings, and total number of expired listings in a time period, a market index may be derived. This market index can then be charted over a plurality of periods, giving an indication of any temporal trends. The market index can further be used to guide and determine the action of a service provider such as a lender or title insurance company in a proposed real estate transaction.

14 Claims, 4 Drawing Sheets

PUGET SOUND REGIONAL CONDOMINIUM MARKET STATISTICS

| | ALL SFD'S | ALL CONDOS | SW KING CTY | SE KING CTY | EAST SIDE | URBAN SEATTLE | SNOHOMISH CTY | 3 BR - 2 + BTH | 2 BR - 2 + BTH | 2 BR - 1.75 + BTH | 2 BR - 1.5 - BTH | 1 BR - 1.5 - BATH |
|---|---|---|---|---|---|---|---|---|---|---|---|---|
| # SOLD | 12,686 | 2,196 | 253 | 244 | 677 | 650 | 292 | 282 | 569 | 837 | 496 | 463 |
| AVG PRICE | 181,525 | 114,952 | 103,536 | 84,258 | 119,588 | 133,184 | 103,324 | 156,430 | 138,350 | 135,010 | 86,899 | 84,577 |
| DOM | 66 | 90 | 91 | 113 | 91 | 87 | 69 | 112 | 107 | 95 | 69 | 83 |
| SUPPLY | 113 | 126 | 173 | 64 | 129 | 124 | 128 | 122 | 150 | 141 | 109 | 114 |
| DEMAND | 81% | 77% | 72% | 83% | 82% | 72% | 80% | 78% | 77% | 78% | 76% | 77% |
| INDEX | 718 | 609 | 414 | 991 | 634 | 581 | 623 | 633 | 512 | 551 | 700 | 681 |

STRAND INDEX: 350, 550, 750, 950, 1150

Fig. 4.

METHOD AND APPARATUS FOR MONITORING THE STRENGTH OF A REAL ESTATE MARKET AND MAKING LENDING AND INSURANCE DECISIONS THEREFROM

This is a continuation of application Ser. No. 08/252,170, filed May 31, 1994, now U.S. Pat. No. 5,636,117, which in turn is a continuation-in-part of application Ser. No. 08/041,144 filed on Mar. 31, 1993, now abandoned, which in turn is a continuation of application Ser. No. 07/667,584 filed on Mar. 11, 1991, now abandoned.

TECHNICAL AREA

This invention is directed towards market analysis and, more particularly, to a method for determining whether to extend credit or provide insurance to a purchaser in a real estate market using sales data regarding that market.

BACKGROUND OF THE INVENTION

The real estate market of the United States can be volatile and uncertain due in part to effects from many external factors. For example, the strength of the local economy, seasonal variations, inflation, interest rates, and other factors all influence the direction of the real estate market. Further, the real estate business is important to the general welfare of the public, with hundreds of thousands of jobs directly related to the housing industry. These include real estate agents, construction workers, bankers, architects, engineers and developers; all of whom rely upon the real estate market for their livelihood. For many of the rest of the population, a real estate purchase represents the single largest investment of their lifetime.

Thus, given the importance of the real estate market, it would be prudent to accurately monitor the relative strength or weakness of a real estate market on a local, regional and national basis. This ability would directly benefit not only those people who are responsible for management of and strategic planning for companies active in the real estate industries, but also all of those who are involved with the purchase of real estate. In addition, in order for banking institutions and other lenders to make a reasoned determination as to whether the extension of credit to a purchaser of real estate is prudent, it is important for these lenders to accurately gauge whether the overall market strength is increasing or decreasing. Similarly, other service organizations such as mortgage and title insurance providers require the same accurate information in order to make their insurance decisions.

Although a number of sources periodically publish various items which can be indicative of activity in parts of the real estate market, such as mortgage interest rates, inflation rates, and/or housing starts, to a vast majority of the population, these figures are relatively narrow and limited in their focus. Moreover, although for a given market, multiple-listing services (MLS) compile various figures as to the selling price of various properties, and other types of numerical data, similarly, these figures are not singularly informative as to the overall strength of the housing market. Nor do they provide a standardized method for comparing different market segments or market locations.

Over the past decade U.S. banks as well as government and private insurors suffered substantial losses related to loans on real estate. If given a standardized system of tracking the strength of our nation's real estate markets in years past, it is probable that the extent of losses attributable to real estate loans would have been considerably lower. For example, the banks could have used the method and apparatus of the present invention to guide their lending decisions.

The method of the present invention as described herein provides a technique for monitoring the strength and trends of a real estate market, whether nationally or locally. Based upon data gathered from the real estate brokers' Multiple Listing Service (MLS), an index which is indicative of the strength of a market may be generated. From a sequence of these indices, the relative strength (trend) of the market can be obtained. Further, real estate service providers, such as governmental or private mortgage entities could use the indices to guide their business decisions.

The method of the present invention can also be used to monitor the strength and trends of other markets. Exemplary, but non-limiting examples may be the market for used yachts or airplanes, providing sufficient market data records are maintained.

SUMMARY OF THE INVENTION

In accordance with the present invention, a method of ascertaining the strength of the whole or a particular segment of the real estate market is provided. The method includes the gathering of sales figures for the part of the market in question over a specified period. The data acquired for a given period includes: all real estate sales which have closed in that period, $S_c$; pending real estate sales at the end of that period, $S_p$; listings which have expired or were withdrawn, canceled or taken off the market for any reason other than a sale during that period, $L_e$; and, actively offered real estate listings at the point in time at which the data sample is obtained, $L_a$. By summing together all closed sales, $S_c$, all pending sales, $S_p$, and expired listings, $L_e$, a total number of properties listed, exposed to the market, then removed for any reason, whatsoever, whether it be sale, expiration, withdrawal, etc., $T_l$. Similarly, by summing all closed sales, $S_c$, with all pending sales, $S_p$, a total of all those successfully marketed properties is available, $T_s$. A demand index, D, is derived as the ratio of successfully marketed properties, $T_s$, over total listed properties, $T_l$. The lower the ratio, the lower the demand. The higher the ratio, the higher the demand. Similarly, a rate of absorption, $R_a$, is obtained by dividing the successfully marketed properties, $T_s$, by the number of days in the period, $P_d$. A supply level, $S_l$, is derived from the ratio of total active listings, $L_a$, by the rate of absorption, $R_a$. Next, a market index, $M_i$, is obtained by dividing the demand index by the supply level. For purposes of readability, a multiplier of 10,000 (or 100,000) is applied to the "raw" market index.

Note that supply is measured in terms of time, i.e., based upon the rate of absorption calculated. There is a certain number of days of supply. Thus, supply reflects not the number of listings, but the amount of time that the current listing inventory will take to be absorbed by the market based upon the historical rate of absorption of the data sample under study.

In accordance with further aspects of the present invention, the market index, $M_i$, may be determined and charted over a plurality of periods to obtain an indication of any temporal trends in the analyzed market segment.

In accordance with still further aspects of the present invention, a risk index $R_i$, may be obtained by dividing the supply level, $S_i$, by the demand index, D.

In accordance with still further aspects of the present invention, the market index, $M_i$, may be modified such that the average selling price of a property in the market is taken into account by multiplying the market index, $M_i$, by the ratio of the average selling price of a property in the current period over the average selling price of a property in the preceding period.

In accordance with still further aspects of the present invention, the market index, $M_i$, may be modified such that changes in the pace of market activity are included. The market index, $M_i$, is divided by the average length of time needed to sell a property in the market during the period.

In accordance with still further aspects of the present invention, the market index is used by a lending institution to determine whether or not to extend credit.

In accordance with still further aspects of the present invention, the market index is used by mortgage or title insurance entities to determine whether or not to extend insurance coverage.

Further features and advantages of the invention will become apparent during the course of the following description in which reference is made to the accompanying drawings, and which is provided purely by way of nonrestrictive example.

BRIEF DESCRIPTION OF THE DRAWINGS

FIG. 4 is a chart showing differences in market indices, $M_i$, for different geographic segments of the condominium market in the Pacific Northwest.

DETAILED DESCRIPTION OF THE PREFERRED EMBODIMENT

Figure 1:
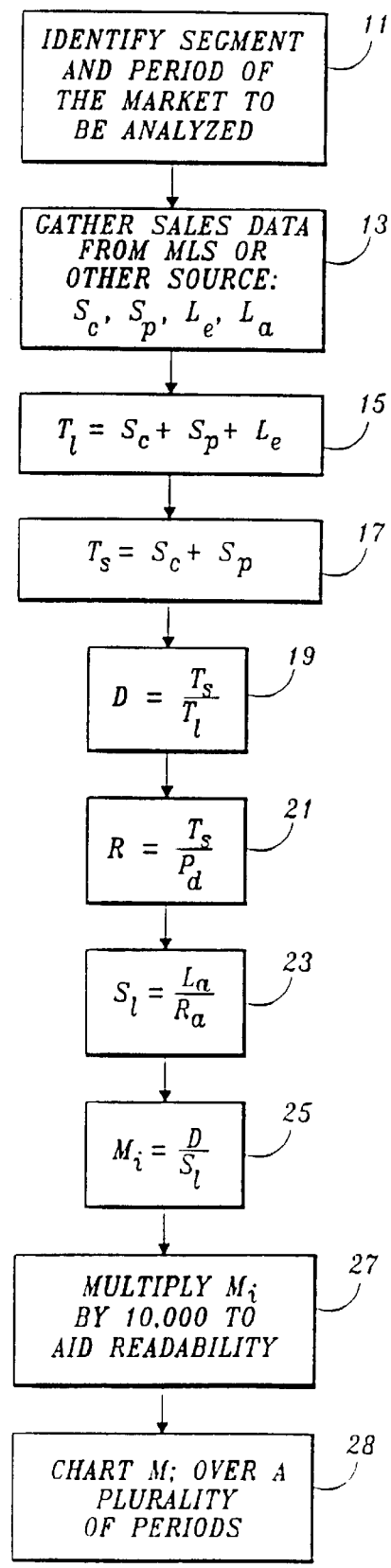
FIG. 1 is a flow diagram of the method of the present invention.

With reference to FIG. 1, at box 11, a segment of the real estate market to be analyzed is identified. In this regard, a segment can be defined either geographically, such as a state, region, city, or neighborhood, or as a residential property type such as new home construction, condominiums, waterfront homes, multi-family dwellings, etc., or a commercial property type such as retail stores, industrial plants, warehouses, etc. The only prerequisite for choosing a segment is the availability of data regarding sale and listing activity.

At box 11, a time period is chosen, over which the analysis is to be accomplished. The period can be defined as the length of time over which sales activity is to be measured; the period may be chosen to be any length of time. During normal residential real estate market activity, the compilation period typically would be one year with the market index $M_i$ calculated each month based on data gathered over the past twelve months. The time period between calculation of $M_i$ may be longer. Alternatively, if desired, for instance during market volatility, compilations may be made more frequently, for example semiannually, biweekly, weekly or even daily.

The raw data required for the method of the present invention can normally be obtained from a real estate broker's multiple-listing service (MLS) or a realtor's association. Most geographical regions of the United States have an MLS which tracks and compiles information regarding the real estate market of the area. Information regarding the sales of property and active property listings are typically maintained as part of a database. The data required can be extracted without difficulty from the MLS database using the appropriate computer search. In particular, a personal computer with a central processing unit and random access memory (RAM) may be used to interface with the MLS database in order to extract the desired data.

After the segment of the market and time period have been identified, at box 13, the relevant data for the segment to be analyzed is gathered. Specifically, the four data variables gathered are: (1) all completed and closed property sales during the period, e.g., during the last twelve months, $S_c$; (2) all property sales still pending (not yet completed escrow) at the end of the period, $S_p$; (3) all properties on the market which have not sold and where the original listing agreement between the broker and the seller has expired (known in the art as "expired listings") during the period, e.g., during the last twelve months, $L_e$ (alternatively, the listings cancelled and listings withdrawn may be added to the listings expired); and, (4) total number of properties which are still active at the end of the period, $L_a$.

By way of further explanation, assume that the period chosen is one year, i.e., 365 days. Then, $S_c$ would be defined to be the number of sales in a segment which were completed and closed during that one-year period. Similarly, $L_e$ is defined to be the total number of property listings which have expired during that one-year period. With respect to the number of pending sales, $S_p$, this figure is the total number of sales in which an earnest money agreement has been executed but the transaction has not yet completed the escrow process. Finally, $L_a$ is the total number of properties that are active listings, i.e., those listings currently available at the time the data sample is taken.

At box 15, the sum of $S_c$, $S_p$, and $L_e$ is obtained to provide a measure of the total number of listings which came to and left the market during the period, $T_l$. Similarly, at box 17, the sum of $S_c$ and $S_p$ is determined to find the total number of properties successfully marketed, $T_s$. From these figures, at box 19, a demand index, D, may be found as the ratio of Ts divided by $T_l$.

A useful tool for measuring the absorption rate of properties in the real estate market may be obtained by dividing the properties successfully marketed, Ts, by the number of days, $P_d$, in the chosen period. This gives a rate of absorption, $R_a$, in properties per day, which is calculated at box 21. From this rate of absorption, $R_a$, a supply level in terms of days, $S_l$, is determined at box 23 by dividing the total number of active listings, $L_a$, by $R_a$.

At box 25, a market index, $M_i$, which is an indicator for the specific period analyzed of the strength of the segment, is calculated by dividing the demand trend, D, by the supply level, $S_l$. Typically the numerical value of $M_i$ is on the order of a few hundredths of a point; therefore, to aid in the readability of the market index, $M_i$, at box 27, $M_i$, is multiplied by a factor of 10,000. It can be appreciated, however, that this last step is not required.

Although the description of the preferred embodiment details the calculation of the market index, $M_i$, as a plurality of individual calculations using the available sales data, it will be appreciated by those skilled in the art that the market index, $M_i$, may be equivalently stated as:

$$M_i = \frac{(S_p + S_c)^2}{P_d L_a (S_c + S_p + L_e)} \tag{1}$$

Thus, whether the market index figure is achieved by following the description of the preferred embodiment as referenced to FIG. 1, or by the equivalent equation shown above, the resulting market index, $M_i$, is identical.

Figure 2:
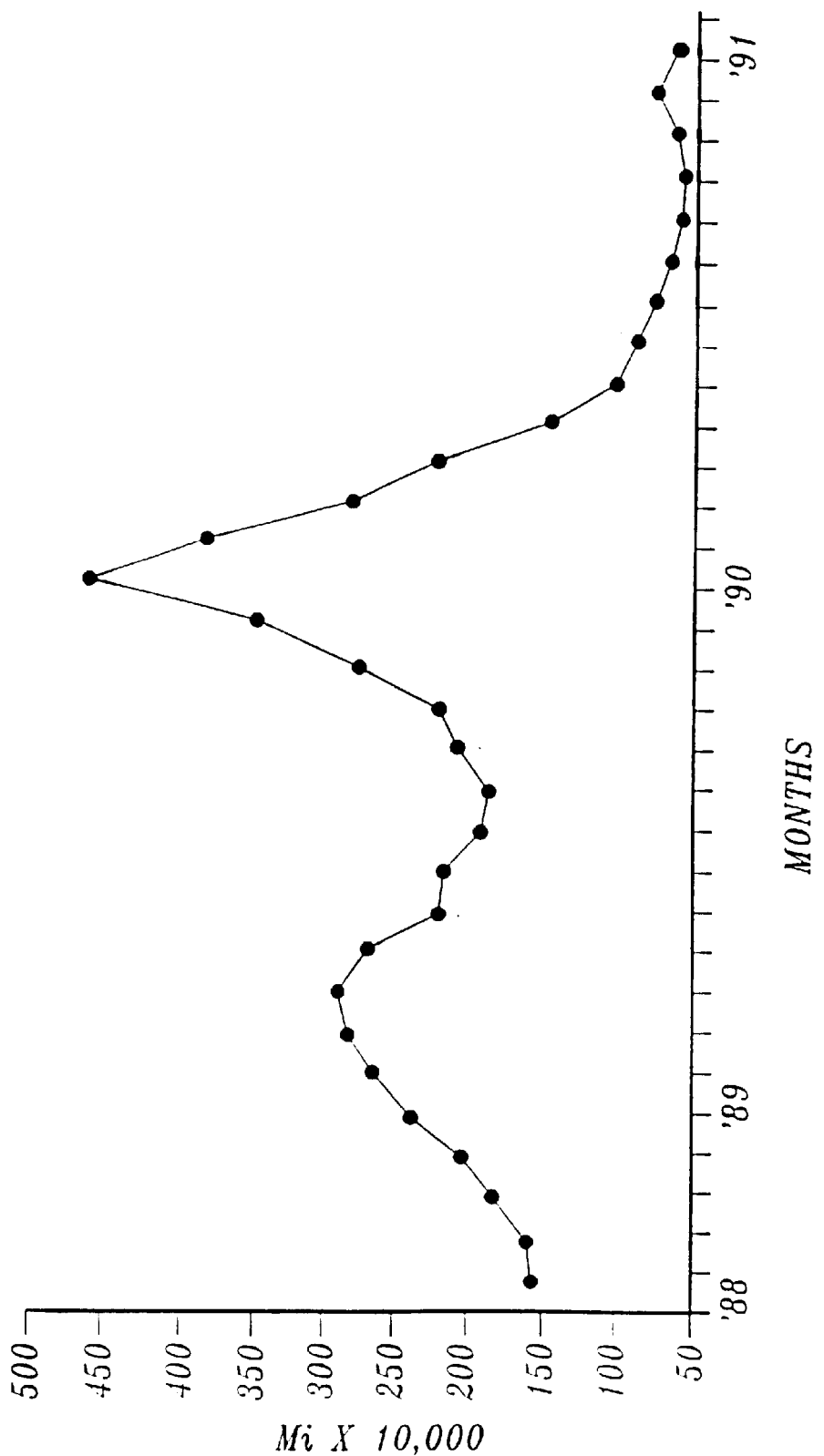
FIG. 2 is a chart of market indices, $M_i$, the chart formed in accordance with the present invention.

With reference to FIG. 2, the market indices, $M_i$, for a plurality of periods are charted on a standard X-Y grid. The X axis represents a time sequence whereby each period in which $M_i$ was calculated is charted. The Y axis is a relative scale for the magnitude of $M_i$. Thus, as can be seen, by charting $M_i$ as determined from the method of the present invention, a temporal indication of the trends in the analyzed segment may be obtained. In the particular chart illustrated in FIG. 2, the data sample period chosen is one year and the market indices, $M_i$, for a geographic region in the Seattle, Wash. area are charted each month from August 1988 to January 1991.

To provide an example of the foregoing method, the market indices corresponding to December 1988 in FIG. 2 will be calculated. As of December 1988 the following data for the prior 12 months of the specified market segment existed:

(1) All completed and closed property sales during the 12-month data sample period, $S_c$: 2,690;

(2) All property sales pending as of December 1988, $S_p$: 357;

(3) Expired listings during the 12-month period, $L_e$: 530;

(4) Total number of properties active as of December 1988, $L_a$: 271.

As depicted in box 15 of FIG. 1, the number of sold, pending and expired (including withdrawn, canceled or any type of removal from the market prior to sale) listings ($S_c$, $S_p$ and $L_e$) is summed to obtain a measure of the total listings on the market during the past 12 months, $T_l$.

| | |
|---|---|
| $S_c$ | 2,690 properties |
| $S_p$ | 357 |
| $L_e$ | 530 |
| $T_1$ | 3,577 |

In a next step depicted in box 17 of FIG. 1 and set forth below, the total number of sold and pending transactions are added together to give a representation of the number of properties successfully marketed over the past 12 months, Ts:

| | |
|---|---|
| $S_c$ | 2,690 |
| $S_p$ | 357 |
| $T_s$ | 3,047 |

Next, as depicted in Step 9 shown in FIG. 1, the summation $T_l$, is divided by the summation $T_s$ provides a ratio that reflects a percentage of properties that were listed and successfully marketed during the past 12 months. This is a reflection of demand. In the present sample, as set forth below, about 85% of the listings that came on the market over the past 12 months were sold while 15% expired.

$$\text{Demand}, D = T_1 / T_s$$
$$= 3,577/3,047$$
$$= 851$$

The average number of sales per day is next calculated. This provides a rate of absorption, $R_a$, of the properties on a daily basis.

$$\text{Rate of Absorption}, R_a = T_s / 365$$
$$= 3,047/365$$
$$= 8.35 \text{ listings per day}$$

From the rate of absorption, $R_a$ a supply level in terms of days, $S_l$, is determined by dividing the total number of active listings, $L_a$ by $R_a$.

$$\text{Supply}, S_1 = L_a / R_a$$
$$= 271/8.35$$
$$= 35.5 \text{ days of supply}$$

As depicted in box 25 of FIG. 1, the market index, $M_i$ is calculated by dividing the demand index, D, by the supply level, $S_l$. As shown by the following calculation, the market index as of December 1988 was 0.0262. This number is typically multiplied by 10,000, see box 27, to provide a more easily readable graph number, i.e., 262.

$$M_i \times 10,000 = D/S_1(10,000)$$
$$= .852/32.5 \times (10,000)$$
$$= .0262 \times 10,000$$
$$= 262$$

The market index of 262 is depicted in the graph of FIG. 2. Similar calculations are typically made over time to provide an indication of the trends in the market segment being tracked. It is to be understood that the foregoing calculations could be carried out in essentially one step by utilizing the Equation (1) set forth above.

As the market strength rises to a peak period, that is very high demand and very low supply relative to typical market activity, it would be prudent for those institutional and governmental participants who bear the burden of risk as a result of real estate lending such as FDIC, mortgage insurance companies, FNMA, and mortgage lenders providing recourse for their paper to make their underwriting criteria more stringent. It is during these market peaks where volatility generates transactions that are consummated at prices above a level that longer term price trends in a market tend to support. Thus, lending institutions and governmental or private sector insurors who utilize this development will probably reduce their risk and non-performing loan burdens substantially.

Also, even without market volatility there are segments in any real estate market that will create greater and lesser risks to those bearing the financial burden of real estate loans. This is illustrated in FIG. 4 detailing differences in geographic segments of the condominium market in the Pacific Northwest. This information can be used by the FDIC, mortgage insurance companies, etc. to determine whether to enter into a transaction pertaining to real estate in a particular market segment.

Figure 3:
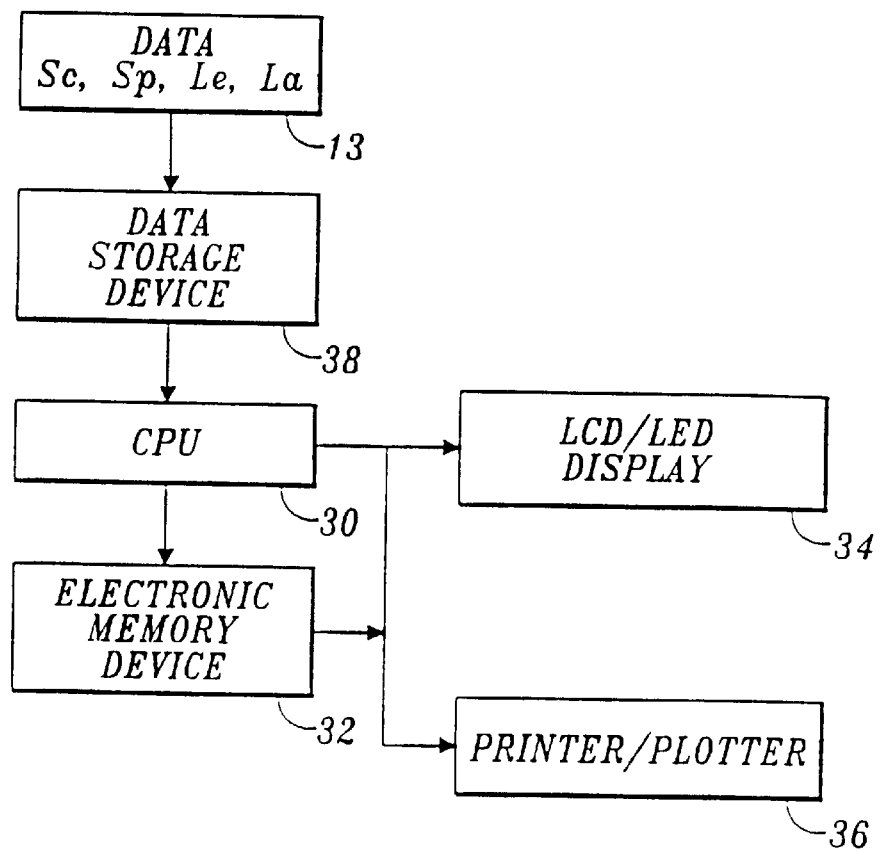
FIG. 3 is a schematic diagram of the apparatus used in conjunction with the present invention.

Further, as shown in FIG. 3, to facilitate determining the market indices, $M_l$, a commercially available calculator or computer having a central processing unit 30 may be used, and the resulting calculations stored in an electronic memory device 32, for instance on a floppy disk, "hard disk", punch tape or cards, all of which are standard articles of commerce. The resulting calculations may be displayed on a visual output device 34, such as a commercially available LCD or LED display or printed or plotted on paper with a commercially available printer/plotter 36. Moreover, the data used in determining $M_i$ may be also stored in an electronic memory device 38 of the types discussed above.

In the foregoing example, the data collected over a twelve-month period was utilized. Using this time interval has the advantage of possibly averaging out variations of real estate sales and/or listings based on normal seasonal fluctuations. However, the compilation time period can be over a different length of time as long as sufficient data is available to provide realistic values for the data variables used to calculate the market index, $M_i$ and the other indices of the present invention. For example, it may be desirable to utilize the intervals of six months or even one month, especially if it is desirable to take seasonal variations into consideration or if the market being analyzed changes very quickly.

In another preferred embodiment of the present invention, a risk index, $R_i$, may also be calculated and charted to give an indication of the relative risk of investing in the segment under analysis. This method is substantially similar to the above embodiment except that, at box 25, a risk index is calculated as the supply level, $S_i$, divided by the demand index, D. As in the preferred embodiment, $R_i$ may also be charted over a period of time to give an indication of any temporal trends present.

In much the same way the market index is used by real estate service providers, the risk index may similarly be used. In particular, if the risk index is below a predetermined threshold or period of volatility, then the service provider, i.e. a lender or title insurance company, will proceed with the transaction. However, if the risk index is above a predetermined threshold, then the service provider or insuror may opt to impose stricter underwriting guidelines when servicing business in the markets or market segments identified by this development as higher risk situations.

In another preferred embodiment of the present invention, the market index, $M_i$, may be modified such that the average selling price of a property in the segment is factored therein. Specifically, a first market index in accordance with the present invention must be determined; then, for a following period, the calculated market index, $M_i$, is multiplied by the ratio of the average selling price of a property in the second period over the average selling price of a property in the first period. This modification is done on each succeeding period, with the price change modification accomplished using price data of the current period compared to the price data with the previous period.

In another preferred embodiment of the present invention, the market index, $M_i$, may be modified such that changes in the "pace" of market activity are included. The pace of market activity is defined as the average marketing time (time between listing and sale) of all properties which have been sold (either closed or pending) during the period. This can be accomplished by first gathering information (obtainable from MLS database) regarding the average marketing length, $A_m$, of a property, and then dividing $M_i$ by $A_m$.

In another preferred embodiment of the present invention, the market index, $M_i$, may be modified such that the expired listings component can be expanded upon to include expired, withdrawn, and cancelled listings.

While the preferred embodiment of the invention has been illustrated and described, it will be appreciated that various changes can be made therein without departing from the spirit and scope of the invention. Specifically, although the preferred embodiment has been described with respect to a real estate market, the method and apparatus of the present invention is equally applicable to a market for a commodity. For example, the market for airplanes and large boats may be tracked. It can be appreciated that data regarding the commodity analogous to the sales data described above with regard to the real estate market is available. Thus, within the scope of the appended claims, it is to be understood that the invention can be practiced otherwise than as specifically described herein.

The embodiments of the invention in which an exclusive property or privilege is claimed are defined as follows:

1. A method of determining whether to extend financial services to a party in a particular commodity market, comprising the steps of:
   (a) using computing means having a central processing unit to gather from a first data source a total number of closed sales, $S_c$, in a particular commodity market in said period;
   (b) using said computing means to gather from a second data source a total number of sales which are pending, $S_p$, in said particular commodity market in said period;
   (c) using said computing means to gather from a third data source a total number of expired listings, $L_e$, in said particular commodity market in said period;
   (d) using said computing means to gather from a fourth data source a total number of active listings $L_a$, in said particular commodity market in said period;
   (e) determining a market index, $M_i$, indicative of the strength of said particular commodity market over a period consisting of a length of days, $P_d$, in accordance with $$M_i = \frac{(S_p + S_c)^2}{P_d L_a (S_c + S_p + L_e)};$$

and
   (f) extending, terminating or repositioning said financial service to said party if said market index is above or within a predetermined threshold of market activity.

2. The method of claim 1, including the step of repeating steps (a) through (e) for a plurality of said periods, and graphically representing in temporal sequence the plurality of market indices, $M_i$, of said plurality of periods and extending said financial service if said market indices remain above said predetermined threshold over a predetermined time period.

3. The method of claim 2, wherein all of said data sources are a multi-listing service (MLS) database.

4. The method of claim 1, wherein said financial service is the extension of credit or directly or indirectly insures the performance of the borrower.

5. The method of claim 1, wherein said financial service is the extension of title insurance.

6. The method of claim 1, further comprising the step of dividing said market index, $M_i$, by the average marketing length, $A_m$, required to sell the properties included within the tabulation of $S_c$ and $S_p$.

7. The method of claim 1, further comprising the step of multiplying said market index, $M_i$, by the ratio of the average selling price of the properties included within the tabulation of $S_c$ and $S_p$ in said period and the average selling price of the properties included within the tabulation of $S_c$ and $S_p$ in the preceding period.

8. A method of determining whether to extend, terminate or reposition financial services in a particular commodity market to a party comprising the steps of:

(a) using computing means having a central processing unit to gather from a database: the total number of closed sales in said period, $S_c$; the number of sales pending in said period, $S_p$; the number of listings which have expired in said period, $L_e$; and, the number of properties actively listed, $L_a$, at the end of said period;

(b) calculating a total number of listed properties in said particular commodity market, T, in accordance with the equation: $T_l = S_c + S_p + L_e$;

(c) determining the total number of successfully marketed properties, $T_s$ in accordance with the equation: $T_s = S_c + S_p$;

(d) determining a demand index, D, as being $T_s$ divided by $T_l$;

(e) calculating a rate of absorption, $R_a$, as being $T_s$ divided by a length of days, $P_d$ to be monitored;

(f) calculating a supply level, $S_l$, as a ratio of $L_a$ divided by $R_a$;

(g) calculating a market index indicative of the strength of the particular commodity market over $P_d$, as the ratio of D divided by $S_l$; and (h) extending said financial service to said party if said market index is above a predetermined threshold.

9. The method of claim 8, including the step of repeating steps (a) through (g) for a plurality of said periods, and graphically representing in temporal sequence the plurality of market indices, $M_i$, of said plurality of periods and extending said financial service if said market indices remain above said predetermined threshold over a predetermined time period.

10. The method of claim 8, wherein said financial service is the extension of credit.

11. The method of claim 8, wherein said financial service is the extension of mortgage or title insurance.

12. An apparatus for calculating a market index, $M_i$ determinative of whether to extend financial services in a particular commodity market including:

(a) means for interfacing with a database to gather from the database: the total number of closed sales, $S_c$, in said market in said period; the total number of sales which are pending, $S_p$, in said market in said period; the total number of expired listings, $L_e$, in said market in said period; and, the total number of active listings, $L_a$, in said market in said period;

(b) computing means receiving from said means for interfacing said $S_c$, $S_p$, $L_e$, and $L_a$ parameters and generating the market index, $M_i$, determinative of whether or not to extend financial services, wherein financial services will be extended if said market index is above a predetermined threshold, said market index $M_i$ being indicative of the strength of the particular commodity market over a period consisting of a length of days, $P_d$, said computing means calculating said market index, $M_i$, in accordance with $$M_i = \frac{(S_p + S_c)^2}{P_d L_a (S_c + S_p + L_e)}.$$

13. The apparatus of claim 12, wherein said financial service is the extension of credit.

14. The apparatus of claim 12, wherein said financial service is the extension of title insurance.

* * * * *